United States Patent [19]

Amano

[11] 4,420,886
[45] Dec. 20, 1983

[54] X-Y PLOTTER FOR PRODUCING DIAGRAMS FROM COMPUTER INFORMATION

[76] Inventor: Toshiaki Amano, 50-2 Aza-kami-Imoda, Oaza-Imoda, Tamayama-mura, Iwate-gun, Iwate-ken, Japan

[21] Appl. No.: 321,698

[22] Filed: Nov. 16, 1981

[30] Foreign Application Priority Data

Nov. 14, 1980 [JP] Japan .............................. 55-160342

[51] Int. Cl.³ ..................... G01D 15/16; F16H 55/52
[52] U.S. Cl. ................................. 33/1 M; 346/139 B
[58] Field of Search ................. 33/1 M, 26; 74/89.22; 346/139 B

[56] References Cited

U.S. PATENT DOCUMENTS

| | | | |
|---|---|---|---|
| 2,746,151 | 5/1956 | Kennedy | 33/1 M |
| 3,182,399 | 5/1965 | Price | 33/1 M |
| 3,379,834 | 4/1968 | Conners | 346/139 B |
| 3,491,716 | 1/1970 | Ranford | 33/1 M |
| 3,611,819 | 10/1971 | Muller et al. | 346/139 B |
| 4,346,867 | 8/1982 | Dick et al. | 33/1 M |

FOREIGN PATENT DOCUMENTS 1232770 10/1960 France .............................. 346/139 B
1210353 10/1970 United Kingdom ................. 33/1 M Primary Examiner—Richard R. Stearns
Attorney, Agent, or Firm—Guy W. Shoup; Eliot S. Gerber

[57] ABSTRACT

An X-Y plotter comprising a pen carriage equipped with a recording pen; a slider for guiding the pen carriage; a first driving arrangement for moving the pen carriage along the slider in the X direction which comprises a first driving motor and a first wire in a closed loop both ends of which are connected to the pen carriage; a second driving arrangement for moving the slider in the Y direction which comprises a second driving motor and a second wire in a closed loop both ends of which are connected to the slider; and a tensioning device comprising a slide equipped with a pair of pulleys and a slack-preventing wire one end of which is connected to the slider; one of the pulleys of the slide engaging the first wire and the other engaging the slack-preventing wire so that the wires are kept free from slack.

4 Claims, 4 Drawing Figures

X-Y PLOTTER FOR PRODUCING DIAGRAMS FROM COMPUTER INFORMATION

BACKGROUND OF THE INVENTION

This invention relates to an X-Y plotter.

More specifically, this invention relates to an X-Y plotter of the wire driving type in which a pen carriage can move quickly in both X and Y directions without causing any wire slackening to produce a chart from computer information.

In recent years the processing of data using computers has made remarkable progress in many applications. With such a background, various output devices which can visibly represent the output information of the computers in diagrams or charts have been proposed. Among them, an X-Y plotter has widely been employed for preparing various diagrams and charts because it provides a detailed hard copy.

Various structures are known of driving devices of pen carriages used in conventional X-Y plotters. In an X-Y plotter of relatively simple structure, a pen carriage is conveyed in the Y direction along a slider which is in turn conveyed in the X direction, according to a wire driving system. The ends of the wires are fixed to the frame of the plotter. However, in the conventional X-Y plotter of this type, the movement of the wire does not lead to the same distance of movement of the pen carriage so that the transmission efficiency of the wire driving system is low.

Accordingly, an object of this invention is to provide an X-Y plotter in which a pen carriage and a slider can move quickly in response to driving means.

Another object of this invention is to provide an X-Y plotter in which wires are always free from slack wherever a pen carriage and a slider are moved in the X and Y directions.

SUMMARY OF THE INVENTION

An X-Y plotter according to this invention comprises a pen carriage equipped with recording pen means; a slider for guiding the pen carriage; and a first driving means for moving the pen carriage along the slider in a first direction, which comprises a first driving motor and a first wire mounted in a closed loop including the motor and the pen carriage. A second driving means is used to move the slider in a second direction orthogonal to the first direction, which comprises a second driving motor and a second wire mounted in a closed loop including the second motor and the slider. Neither wire loop is fixed to the frame of the plotter. Tension means engages the first wire for keeping the first wire free from slack.

In the X-Y plotter of this invention, both ends of the first wire are fixed to the pen carriage and both ends of the second wire are fixed to the slider. The first wire constitutes a closed loop starting from the pen carriage, passing through the first driving motor and suitable sets of pulleys and returning to the pen carriage. On the other hand, the second wire constitutes a closed loop starting from the slider, passing through the second motor and suitable sets of pulleys and returning to the slider. According to this arrangement, when the first motor moves the first wire by a certain distance, the pen carriage also moves along the slider by the same distance. The same is true of the second wire.

In this arrangement, however, if the slider moves toward guide pulleys for the first wire the first wire would slacken. In addition, even if the second motor is actuated to move the slider away from the above pulleys for the first wire, it would be obstructed by the first wire. In order to solve these problems, the X-Y plotter of this invention includes tension means.

The tension means comprises slide means equipped with a pair of pulleys and a slack-preventing wire. The slide means is movable along a guide means extending in the second direction over the entire span of movement of the slider. One pulley of the slide means engages the first wire and the other pulley engages the slack-preventing wire. The slack-preventing wire has one end fixed to the slider and the other end fixed to the frame of the X-Y plotter. The tension means are disposed on both sides of the first motor, preferably in a symmetrical manner.

Thanks to the tension means, the first wire does not slacken wherever the pen carriage and the slider are located. Namely, when the second motor is actuated to move the slider by a certain distance toward the guide pulleys for the first wire, the slack-preventing wire pulls the slide means in the opposite direction by a half of the above distance according to the arrangement of the slack-preventing wire. This half distance is just the same as being required to absorb the excess length of the first wire created by the movement of the slider. Thus, no slack appears in the first wire during the movement of the slider in the second direction. The same is true of when the slider is moved away from the pulleys for the first wire.

Thus, in the X-Y plotter of this invention, the pen carriage and the slider can move as quickly as the wires driven by motors without suffering from any slack in the wire system.

The invention will be described in more detail with reference to the drawings.

BRIEF DESCRIPTION OF THE DRAWINGS

FIGS. 2 through 4 show the X-Y plotter in accordance with an embodiment of the present invention wherein:

FIG. 2 is a partially simplified perspective view;

FIG. 3 is an operation diagram; and

FIG. 4 is a perspective view showing a slide plate.

DESCRIPTION OF THE PREFERRED EMBODIMENT

Figure 1:
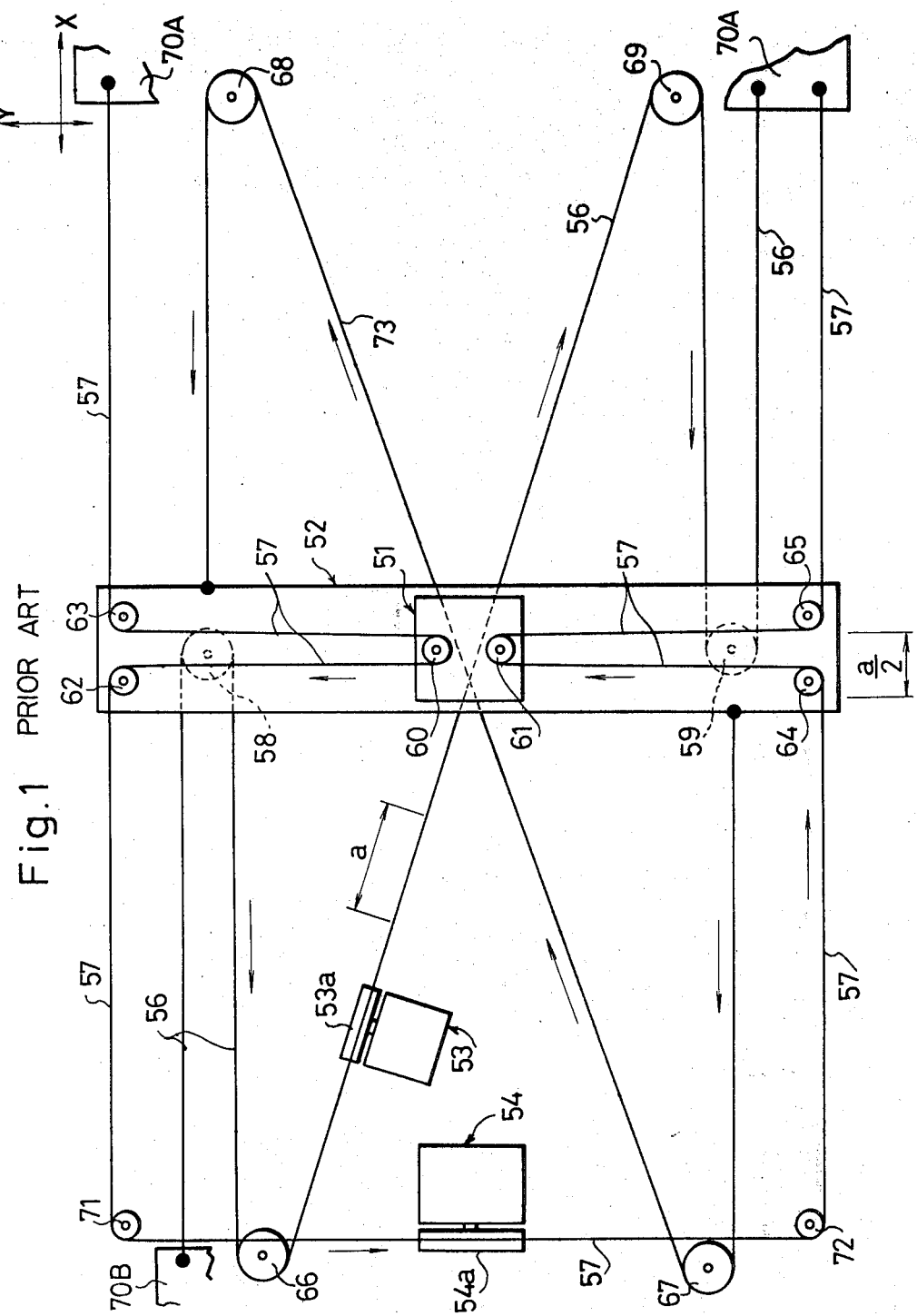
FIG. 1 shows a conventional X-Y plotter.

For the sake of better understanding of the present invention, the conventional X-Y plotter of this type will be first described with reference to FIG. 1.

Reference number 51 indicates a pen carriage which is equipped with a pen operating mechanism (not shown) and two idle pulleys 60,61. A slider 52 having guide rail means for the pen carriage 51 extends in the Y direction and is supported by suitable guide rail means extending in the X direction perpendicular to the slider 52. The slider 52 has a pair of pulleys 58,59 for movement in the X direction and two pairs of guide pulleys 62,63 and 64,65 for moving the pen carriage 51 in the Y direction.

Reference number 53 indicates a motor with a driving pulley 53a for driving a wire 56. The wire 56 is fixed to right and left frames 70A and 70B at both ends and mounted around pulleys 59,69,66 and 58 in that order from the right frame. The pulleys 66 and 69 are rotatably mounted on a bottom frame (not shown). Reference number 54 indicates a motor with a driving pulley 54a for driving a wire 57, both ends of which are fixed to the right frame 70A. the wire 57 is mounted between them via pulleys 63,60,62,71,72,64,61 and 65. The pulleys 71 and 72 are also rotatably mounted on the bottom frame. Reference number 73 indicates a wire mounted around pulleys 67 and 68 located on both sides of the slider 52, and fixed to the slider 52 at both ends.

When the wire 56 is driven by the motor 53 in the direction of the arrow as shown in FIG. 1, the pulley 58 is pulled leftwardly in the X direction so that the pen carriage 51 supported on the slider 52 moves in that direction. On the other hand, when the wire 57 is driven by the motor 54 in the direction of the arrow as shown in FIG. 1, the pulley 60 of the pen carriage 51 is pulled upwardly in the Y direction.

Since the abovementioned structure accomplishes the movement of the pen carriage in both X- and Y-directions by means of a wire driving system, its mechanism is simple. However, since this structure employs a driving method of a so-called running block system for driving in both X and Y directions, the following problem occurs. Namely, even if the X direction driving wire 56 moves by a distance (a), the slider 52 moves no more than half the distance (a/2). The same is true of the movement of the carriage 51 in the Y direction by means of the wire 57. Thus, the X-Y plotter of the prior art is low in efficiency, which is a serious bottleneck to accomplish the high speed movement of the pen carriage.

Next, the embodiment of the present invention will be described.

Figure 2:
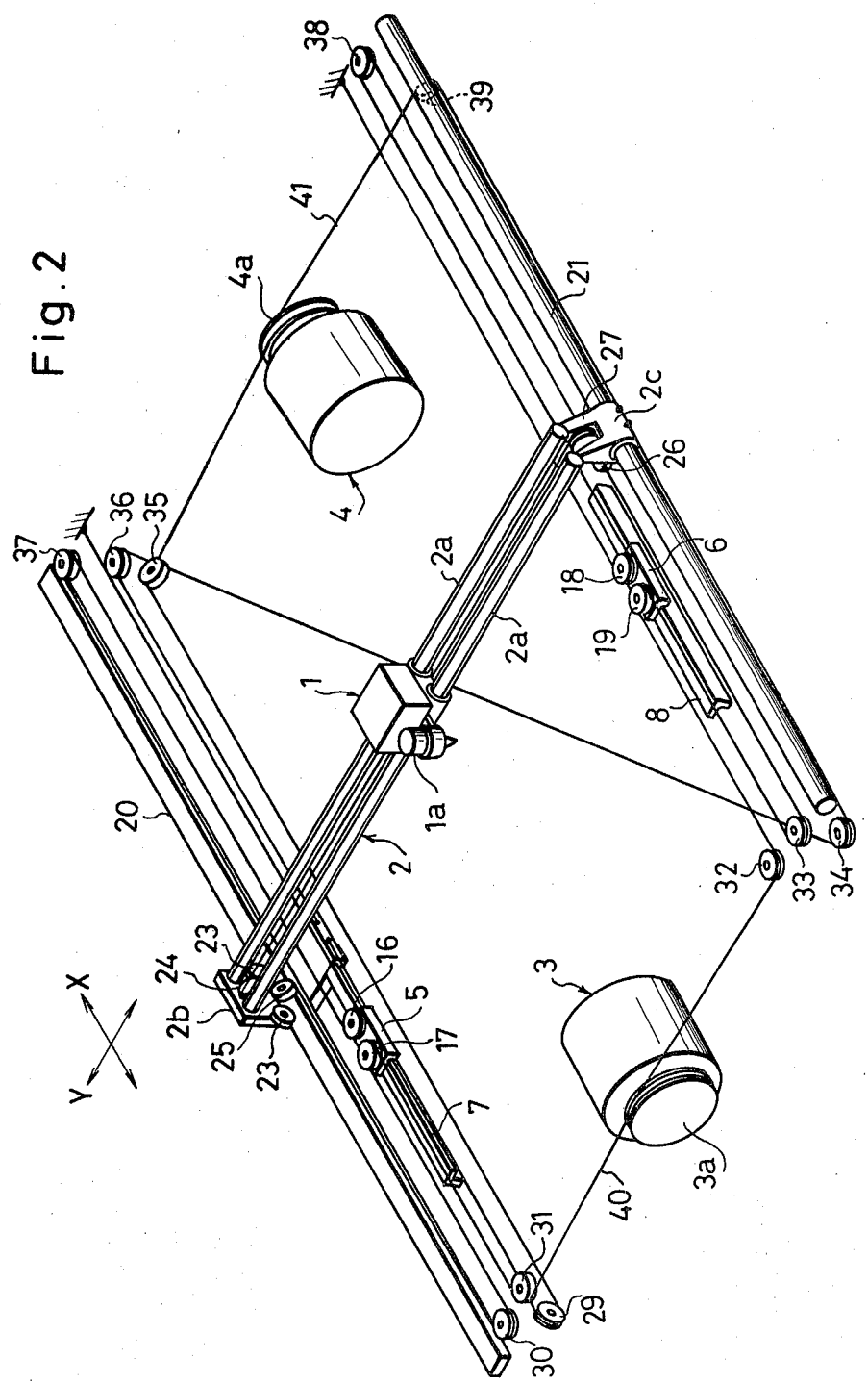
Figure 3:
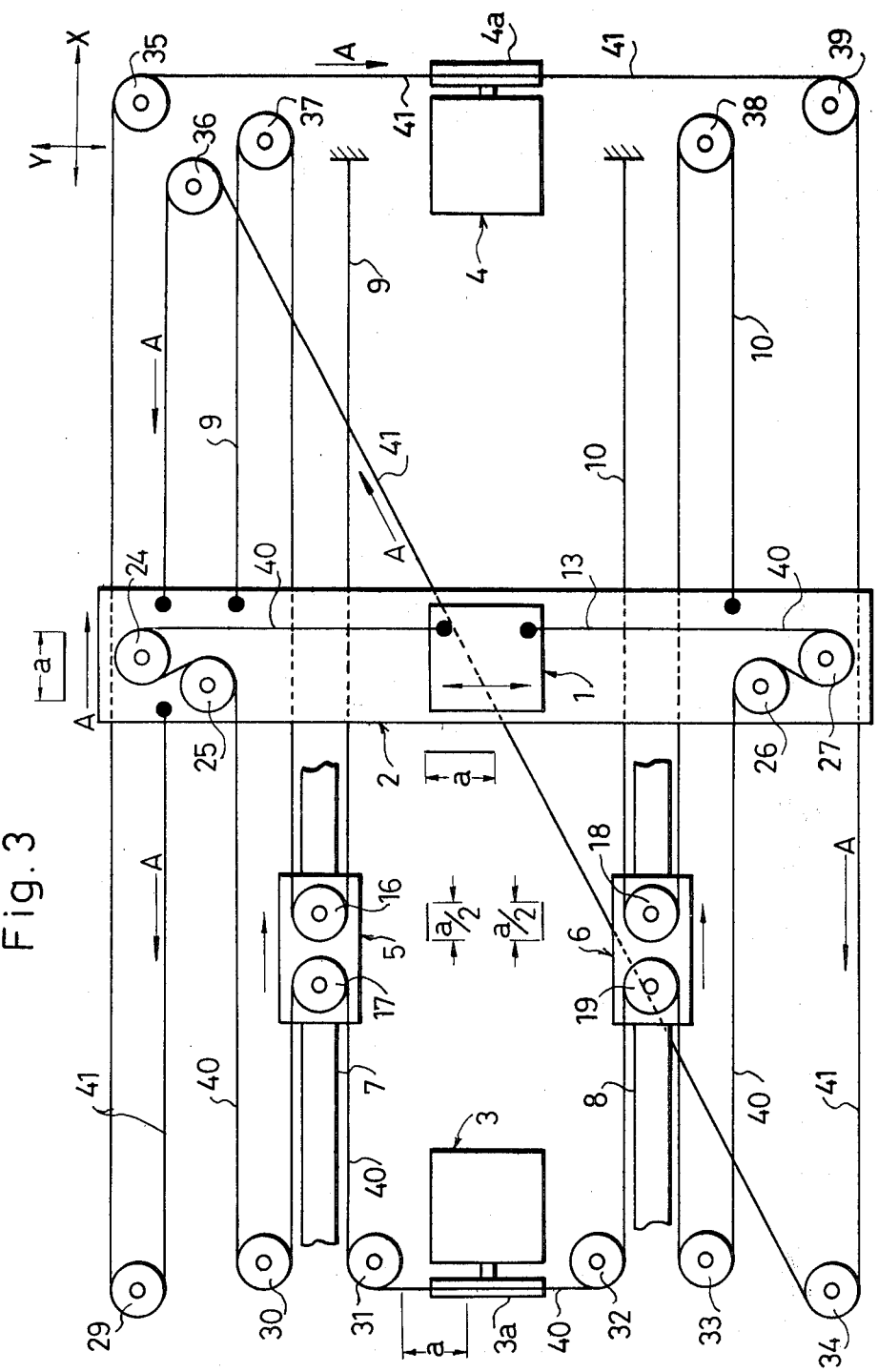
Figure 4:
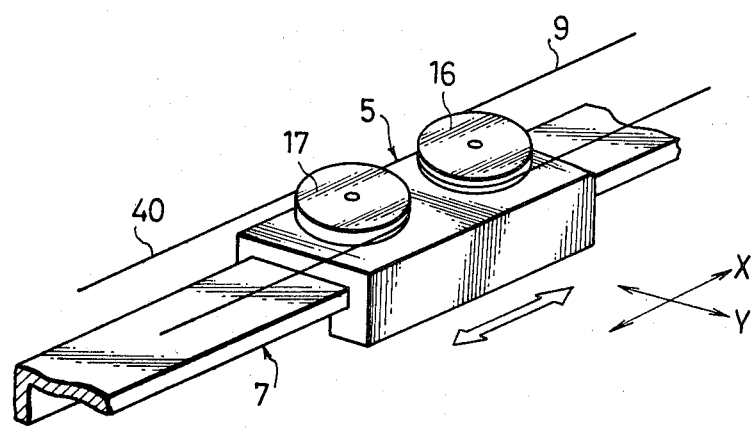

Referring to FIGS. 2–4, reference number 1 indicates a pen carriage holding a pen operating mechanism 1a. A slider 2 comprises two guide shafts 2a extending in the Y direction, on which the pen carriage 1 slides back and forth, and a pair of support members 2b, 2c to which both ends of the two guide shafts 2a are fixed. One support member 2b has rollers 23, 23 rotatably mounted thereon, by which the support member moves on a guide plate 20 extending between side frames (not shown). Another support member 2c is slidably guided on a guide shaft 21 extending between the side frames. According to this structure, the slider 2 moves back and forth in the X direction. The support members 2b and 2c have a pair of guide pulleys 24,25 and 26,27, respectively.

Reference number 3 indicates a first motor with a driving pulley 3a for driving a first wire 40 which serves to move the pen carriage 1 along the guide shafts of the slider 2 in the Y direction. The wire 40 is wound a few times around the driving pulley 3a. This first wire (Y direction driving wire) 40 is connected to the pen carriage 1 at both ends and is mounted around the pulleys 24,25,30,17,31,32,19,33,26 and 27. The pulleys 30,31,32 and 33 are respectively rotatably mounted on a frame (not shown), and the pulleys 17 and 19 are rotatably mounted on slide plates 17 and 19, respectively. The motor 3 is located between the pulleys 31 and 32. Thus, the Y direction driving wire 40 constitutes a closed loop including the pen carriage 1 and the Y direction driving motor 3. It may be stretched under tension so as to avoid slack. According to this structure, when the Y direction driving wire 40 is conveyed by a quantity (a) by the Y direction driving motor 3, the pen carriage 1 is also conveyed by the quantity (a) which is the same as that of the wire.

Reference number 4 indicates a second motor 4 with a driving pulley 4a for driving a second wire 41 which serves to move the slider 2 in the X direction. The second wire (X direction driving wire) 41 is wound a few times around the driving pulley 4a. The X direction driving wire 41 is connected to the slider 2 at both ends and is mounted around pulleys 29,35,39,34 and 36, all of which are rotatably mounted on the frame. The X direction driving motor 4 is located between the pulleys 35 and 39. Thus, the X direction driving wire 41 also constitutes a closed loop including the slider 2 and the motor 4. It may be stretched under tension so as to avoid slack. According to this structure, when the X direction driving wire 41 is moved by a quantity (a) by the X direction driving motor 4, the slider 2 is also conveyed by the distance (a) so as to follow up the movement of the wire.

Reference numbers 5 and 6 indicate slide plates. The slide plate 5 has a pair of pulleys 16 and 17, and the slide plate 6 also has a pair of pulleys 18 and 19. The slide plates 5 and 6 are slidable on guide rails 7 and 8, respectively, each of which extends in the X direction between the slide frames of the X-Y plotter, though it is merely partially depicted in FIGS. 2 and 3. As is clearly shown in FIGS. 2 and 4, the guide rail 7 has an L-shaped cross section, and the slide plate 5 has a vertical portion with an inside groove in which a side edge of the horizontal guide plate of the guide rail 7 is slidably received without substantial clearance, and another vertical portion, inside wall of which is kept in contact with the vertical portion of the L-shaped guide rail 7. The slide plate 6 and guide rail 8 have the same structures as those of the slide plate 5 and guide rail 7. In order to permit these slide plates 5,6 to slide smoothly on the guide rails 7,8, the sliding surfaces of these members should have a low frictional coefficient. For this purpose, the guide rails 7,8 have surfaces coated with a teflon layer in this embodiment.

Mounted around the pulleys 16 and 18 of the slide plates 5 and 6 are wires 9 and 10, respectively. One end of the wire 9 is fixed to the frame and it is connected to the slider 2 via the pulley 16 on the slide plate 5 and a pulley 37 rotatably mounted on the frame. The other wire 10 has the same structure. Namely, it starts from one end fixed to the frame and is connected to the slider 2 via the pulley 18 on the slide plate 6 and a pulley 38 rotatably mounted on the frame.

The slide plates 5,6 and wires 9,10 prevent the wire 40 from becoming slack. If the slider 2 moves, for example, in the direction of the arrow A shown in FIG. 3 by a distance (a), the wire 40 would slacken by the same length on both sides of the motor 3 unless something is done for offsetting it. However, since the wires 9 and 10 are connected to the slider 2, the leftward movement of the slider 2 naturally leads to the rightward movement of the slide plates 5 and 6. The movement of the slide plates 5 and 6 is a half of the movement of the slider 2 because of the arrangement that each of the pulleys 16 and 18 is pulled by two wire portions one of which is fixed to the frame and the other of which engages the pulley mounted on the frame. This half distance (a/2) is just the same as the distance by which the slide plates 5 and 6 must move rightwardly to absorb the excess length (a) of the wire 40 created by the leftward movement of the slider 2, because of the same arrangement of the wire 40 around the pulleys 17,19 of the slide plates 5,6.

Thus, the wire 40 does not slacken thanks to the slide plates 5,6 and wires 9,10. On the other hand, when the slider 2 moves in the opposite direction (rightwardly), the slide plates 5 and 6 are pulled leftwardly by the wire 40 by half the distance of movement of the slider 2 to absorb the excess length of the wires 9,10 created by the rightward movement of the slider 2.

As mentioned above, since the wire 40 is always free from slack, the pen carriage 1 can be moved along the slider 2 reliably at a high speed wherever the slider 2 is located in the X direction. And since these tension means are symmetrically disposed in the longitudinal direction of the slider 2, they work stably. In order to make sure the slack-preventing function of the slide plates, the tension wires 9,10 may be always under tension to some extent.

According to this arrangement, the slider and the pen carriage can move at a higher speed than in the prior art X-Y plotter without causing any slackening of the wires. Hence, the present invention provides a great industrial advantage when adapted to X-Y plotters of this kind in which driving in the X and Y directions is effected by the means of the wires.

What is claimed is:
1. An X-Y plotter comprising:
   (a) a frame
   (b) a pen carriage equipped with recording pen means to make marks on a recording surface;
   (c) a slider upon which said pen carriage is movably mounted for sliding motion in a first direction thereon, said slider means being movably mounted on said frame for sliding motion in a second direction orthogonal to the direction of pen carriage movement;
   (d) a first driving means for moving said pen carriage along said slider, which comprises a first driving motor and a first wire mounted in a closed loop not fixed to said frame, said loop including said motor and said pen carriage;
   (e) a second driving means for moving said slider in said second direction, which comprises a second driving motor and a second wire mounted in a closed loop not fixed to said frame including said second motor and said slider; and
   (f) tension means engaging said first wire for keeping said first wire free from slack;
   wherein said tension means comprises slide means which is equipped with a pair of pulleys, one of which engages said first wire and is movable along guide means in the second direction; and a slack-preventing wire having one end fixed to said slider and the other end fixed to said frame and engaging another pulley of said slide means so that said slack-preventing wire keeps said first wire free from slack through said slide means.

2. The X-Y plotter according to claim 1 wherein a pair of said tension means are disposed symmetrically with respect to the center of said slider in its longitudinal direction.

3. The X-Y plotter according to either of claims 1 or 2 wherein both ends of said first wire are fixed to said pen carriage, and both ends of said second wire are fixed to said slider.

4. The X-Y plotter according to either of claims 1 or 2 wherein at least one contact surface of said slide means and said guide means has a coating of a low frictional coefficient.

* * * * *